April 1, 1952    G. H. TOMLINSON ET AL    2,590,905
APPARATUS FOR CONCENTRATING RESIDUAL PULP
LIQUOR BY DIRECT CONTACT WITH FLUE GASES
Filed Oct. 15, 1947    3 Sheets-Sheet 1

INVENTORS
George H. Tomlinson
BY & Joseph N. Swartz
ATTORNEY

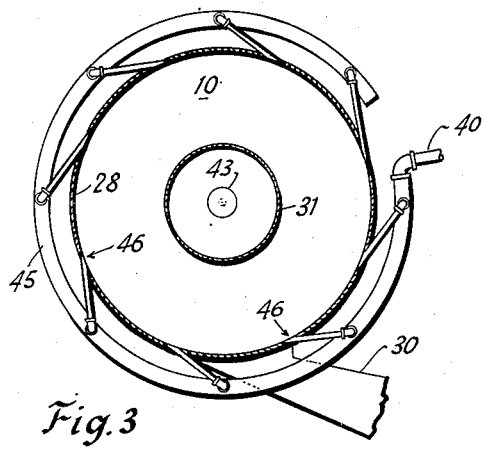
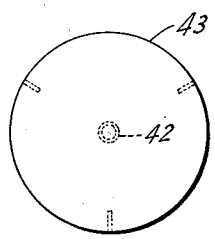
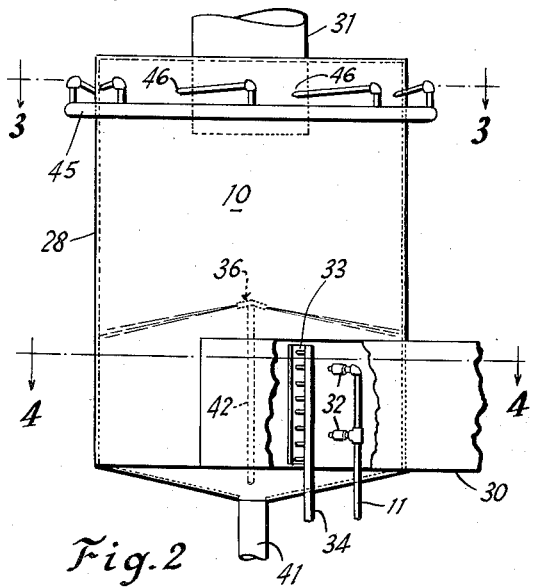
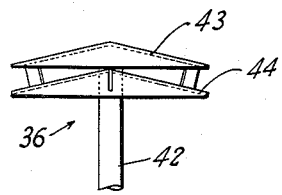
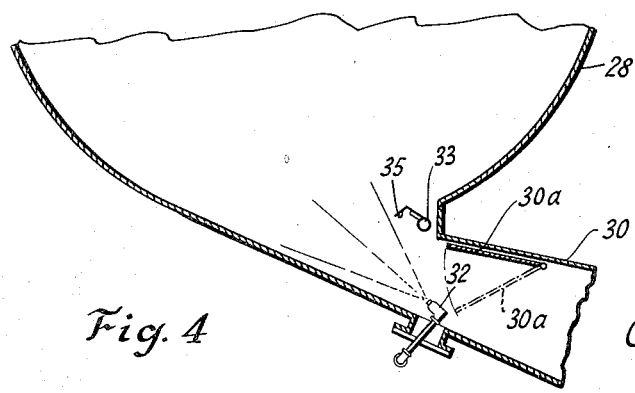
INVENTORS
George H. Tomlinson &
BY Joseph N. Swartz
ATTORNEY April 1, 1952  G. H. TOMLINSON ET AL  2,590,905
APPARATUS FOR CONCENTRATING RESIDUAL PULP
LIQUOR BY DIRECT CONTACT WITH FLUE GASES
Filed Oct. 15, 1947  3 Sheets-Sheet 3

INVENTORS
George H. Tomlinson &
BY Joseph N. Swartz
ATTORNEY

UNITED STATES PATENT OFFICE 2,590,905

APPARATUS FOR CONCENTRATING RESIDUAL PULP LIQUOR BY DIRECT CONTACT WITH FLUE GASES

George H. Tomlinson, Montreal, Quebec, and Joseph N. Swartz, Cornwall, Ontario, Canada, assignors to Canada Paper Company, Montreal, Quebec, Canada, a corporation of Canada Application October 15, 1947, Serial No. 780,090

5 Claims. (Cl. 159—4)

The present invention relates to apparatus for the recovery of chemicals and heat from the flue gases discharged from a chemical recovery unit in which a pulp residual liquor is incinerated. More particularly the invention relates to a cyclone evaporator for the concentration of residual liquor by direct contact with the flue gases resulting from the incineration of concentrated residual liquor.

In the recovery of chemicals from a pulp residual process liquor containing inorganic chemicals and combustible organic matter, such as, for example, black liquor of the sulfate process of manufacturing paper pulp, the liquor is concentrated by evaporation to a solid concentration of 45–70% and its combustible constituents burned in a furnace to recover the included inorganic chemicals and to generate heat for absorption in an associated heat exchange apparatus. The heat absorptive surface installed in the unit is customarily limited by economic factors to a recovery of the relatively high temperature potential heat in the combustion gases. As a result, the temperature of the flue gases leaving the usual sulfate process chemical and heat recovery unit will be in the range of 400–600° F. and contains a substantial amount of low potential heat.

It is desirable to recover the low potential heat and chemicals from the flue gases before they are exhausted to the atmosphere. This can be done by the apparatus and process disclosed and claimed in the co-pending joint application of George H. Tomlinson and George H. Tomlinson, II, Serial No. 640,360, filed January 10, 1946. As disclosed in the co-pending application, this involves the oxidation of the residual liquor in the sulfate pulp process to stabilize the sulfur compounds in the liquor so as to avoid the formation of $H_2S$ and similar gases during direct contact between the flue gases and the liquor. After concentrating the liquor by direct contact with the flue gases, the gases are further treated for the removal of fume and the additional recovery of heat.

Heretofore it has been customary to utilize some of the sensible heat in the flue gases to concentrate the residual liquor prior to its incineration. This is accomplished by direct contact heat exchange between the flue gases and partially concentrated residual liquor in a spray tower, a disc evaporator, or the like. The thermal efficiency of the recovery process is substantially improved by the heat recovery resulting from the direct contact of hot flue gases with the residual liquor and by a saving in the amount of steam used in the multiple effect evaporators to attain an equivalent solid content of the liquor delivered to the recovery furnace.

While the primary advantage of the direct contact between the flue gases and the residual liquor lies in the thermal recovery due to concentrating the liquor prior to its incineration, the contact therebetween also leads to a partial removal of entrained solids in the gases and to an absorption of gaseous sulfur oxides by the liquor, resulting in a chemical saving to the process. The extent of sulfur oxide absorption depends upon the temperature-time relationship of and an intimate contact between the gas and the liquid as well as the stabilized or unstabilized condition of the sulfur oxides in the flue gases. As described in the previously mentioned applications the sulfur compounds in a sulfate residual liquor can be stabilized by oxidation without combustion, so that the contact between the liquor and the flue gas will not evolve $H_2S$ and other objectionable gases. Under such circumstances the gases may be cooled to a temperature range of 180–190° F. for most effective sulfur oxide absorption in the black liquor, which results in a substantially complete absorption of the gaseous sulfur compounds, and avoidance of the attendant or subsequent danger of sulfur compound corrosion of metallic parts.

On the other hand, when the sulfate residual liquor has not been oxidized to stabilize the sulfur compounds, the contact between flue gas and liquor releases sulfur compounds, such as $H_2S$, which are not recoverable by available apparatus in the pulping process. This results in a residual sulfur content in the gas, which prevents the use of optimum low gas temperatures for most effective sulfur oxide absorption in the liquor and the flue gases must be maintained above their dew point in leaving the evaporator.

A further difficulty occurs in the apparatus heretofore available with an excessive carry-over of black liquor spray droplets from the direct contact evaporator which upon contact with a surface away from the liquor stream carbonates with the formation of an insoluble lignin deposit. This deposit dries out and upon exposure to any excessive temperature carbonizes with a resultant plugging of the unit and the connecting ducts. This necessitates frequent shut-down of the equipment for the removal of such deposits. Spray particles of liquor that are not deposited on the walls of the equipment and which escape to the atmosphere with the flue gas stream not only represent a substantial chemical loss to the unit but also create a serious industrial nuisance.

We have found that the problem of black liquor entrainment in the flue gases leaving a direct contact liquor evaporator can be solved by passing these gases through a cyclonic separating zone, which may be subsequent to the direct contact liquor evaporator zone or preferably combined therewith in a common cyclone vessel. In such a vessel a stream of flue gases is tangentially introduced and the gases laden with liquor to be evaporated which has been mixed therewith during or immediately subsequent to the introduction are passed upwardly at a relatively high velocity through a helical path in intimate scrubbing contact with boundary walls continuously wetted with previously treated liquor to form a descending liquor film for the boundary walls. The centrifugal effect of the rotating gas stream in contact with the wetted wall surface is prolonged for a period sufficient for substantially all of the liquor particles and a substantial portion of coarse solid matter entrained with the gases to be deposited in the wet film on the boundary walls before the gases are discharged from the separating zone. During the period of suspension in the gases and while in the descending liquor film, the intimate contact between the liquor particles and the surrounding or contacting hot gases causes the evaporation of a portion of their water content. This evaporating effect is substantially increased, while limiting the axial length of the evaporating and separating zone, by recycling the partly dehydrated liquor until a predetermined concentration is effected at which concentration it is withdrawn. Advantageously the liquor is continuously drained from the evaporating and separating zone to avoid the formation of a liquor pool in the bottom thereof.

The described evaporating effect is obtained in the cyclone evaporator by the use of relatively coarse liquor sprays and is regulated by the controlled recirculation of partially dehydrated liquor in contact with the flue gases. Thus with a liquor containing stabilized sulfur compounds, such as oxidized sulfate liquor, which does not evolve noxious gases upon contact with hot flue gases, the recirculation of partially dehydrated liquor may be regulated to attain optimum temperature conditions in the evaporator for maximum gaseous sulfur oxide absorption and a high degree of liquor concentration. When the liquor contains unstable sulfur compounds which evolve gaseous sulfur compounds upon contact with the hot flue gases in the evaporator, the recirculation of partially dehydrated liquor can be regulated to maintain the escaping flue gases above their dew point temperature. This will avoid the condensation of corrosive liquids in any subsequent equipment.

The main object of the present invention is to provide an improved apparatus for the concentration of residual liquor by the evaporation of moisture therefrom in direct contact with flue gases resulting from the incineration of concentrated residual liquor. A further and more specific object is to provide apparatus for the concentration of residual liquor by direct contact with hot flue gases wherein a high concentration of the liquor is obtained without a carry-over of residual liquor in the discharging flue gases, and a substantial absorption of the gaseous sulfur oxides in the flue gases into the concentrated liquor. An additional object is to provide apparatus of the character described having a high heat and chemical recovery efficiency of simple and low cost construction and operation, low space requirements, ease of operation, and freedom from the necessity of frequent cleanings.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described embodiments of our invention.

Of the drawings:

Fig. 2 is an enlarged elevation of the cyclone evaporator;

Fig. 3 is a horizontal section on the line 3—3 of Fig. 2;

Fig. 4 is a fragmentary horizontal section on the line 4—4 of Fig. 2;

Fig. 5 is an elevation of one of the spraying devices;

Fig. 6 is a plan view of the construction shown in Fig. 5;

Figure 1:
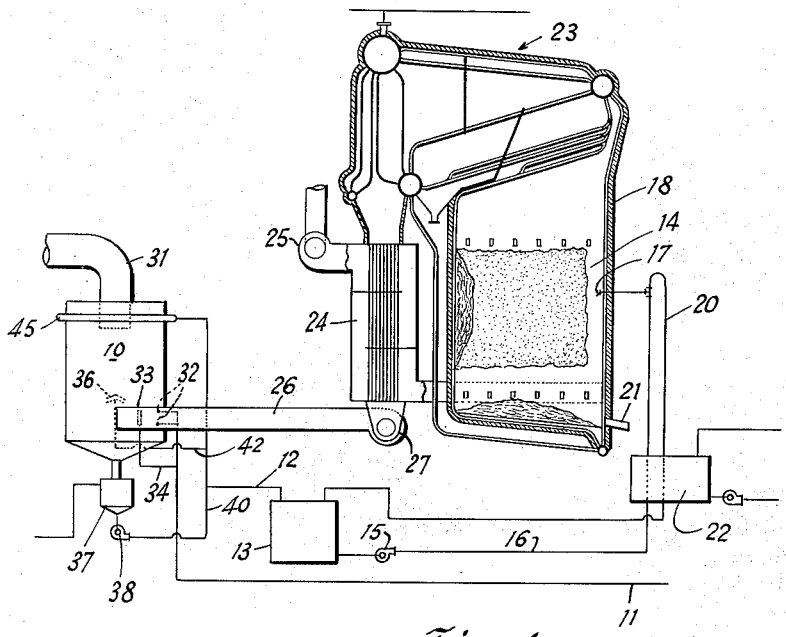
Fig. 1 is a digrammatic view of a chemical and heat recovery furnace and a cyclone evaporator for pulp residual liquor constructed in accordance with the present invention.

In general, the present invention includes a cyclone evaporator 10 arranged to concentrate a residual black liquor by direct contact with the flue gases resulting from the incineration of a concentrated black liquor. As shown in Fig. 1, the evaporator 10 is arranged to receive residual liquor through a liquor supply pipe 11. The source of liquor supply may be a multiple effect evaporator (not shown) wherein the liquor is partially concentrated, or any other suitable source. The liquor is concentrated in the evaporator and is directed through a pipe 12 to a mixing tank 13 wherein salt cake may be added, if desired, to the liquor preparatory to the use of the liquor as a fuel in a recovery furnace 14 of the general type shown, for example, in U. S. Patent 2,161,110. The liquor is withdrawn from the tank 13 by a pump 15 and delivered through a feed pipe 16 to an oscillatable liquor spray gun 17 situated in a wall 18 of the furnace 14. Preferably, the pipe 16 is provided with an extension pipe 20 beyond the spray gun take-off and located so as to return excess liquor to the mixing tank 13. By continuously circulating excess liquor, the pipes 16 and 20 will be kept clean.

The liquor delivered to the furnace 14 is incinerated in a well known manner with the production of a liquid or semi-liquid smelt and hot combustion gases. The smelt flows through a spout 21 at the lower end of the furnace and is deposited in a tank 22 wherein it is dissolved and subsequently treated for reuse in the pulp digesters (not shown).

The high grade heat generated by the combustion of the liquor is absorbed from the gases of combustion by a series of heat absorptive surfaces, such as the tubes of the boiler 23 shown in Fig. 1. The cooled gases leaving the boiler are passed through a tubular air heater 24 wherein air, delivered by the forced draft fan 25, is heated in its passage through the heater 24 and passed to various sets of air ports in the furnace for use as combustion air. The flue gases drawn through the heater are delivered to a duct 26 by an induced draft fan 27. The flue gases, with entrained solids and gaseous chemicals then pass through the duct 26 to the evaporator 10 as hereinafter described.

In accordance with our invention, as shown in Figs. 2–6, the evaporating and separating apparatus or cyclone evaporator 10 consists of a cylindrical body 28 provided with an inverted conical bottom and a tangential inlet 30 in the lower portion of the chamber formed by the cylindrical body 28. Flue gases resulting from the combustion of a residual liquor in the recovery furnace 14 pass through the duct 26 at a positive pressure to enter the evaporator 10 at a relatively high velocity through the inwardly tapering tangential inlet 30, thence flowing upwardly in a helical path along the chamber wall. An externally operable baffle 30a controls the effective flow area of the inlet 30, and thereby the entering gas velocity, and is hinged at its outer end to the inner side of the duct to maintain a tangential gas entry at all times. A flue gas outlet from the evaporator chamber is formed by a vertical duct 31 centrally arranged in the top of the chamber having its open end at a level substantially below the top of the chamber so that a complete change in direction of flow of the gas stream is effected in the annular space surrounding the duct 31 before the gases exit from the chamber.

If the hot gases were to flow through the evaporator at the same temperature as the gases leave the air heater 24, the gas temperature within the evaporator would be too high for the optimum conditions for sulfur oxide absorption. Moreover such high gas temperature would tend to cause liquor to dry out and carbonize on any spraying devices in the evaporator chamber. In accordance with the invention, optimum temperature conditions for sulfur oxide absorption and protection of such nozzles from liquor carbonization are obtained by rapidly and substantially reducing the temperature of the entering flue gases. The provisions for this purpose include a plurality of vertically spaced spray nozzles 32 extending into the inlet 30 and arranged to discharge relatively coarse conical sprays of residual liquor from the pipe 11 towards and across the gas entrance area of the duct 26 into the evaporator chamber, as indicated in Fig. 4. A second series of vertically spaced spray nozzles 33 at the opposite side of the inlet 30 receives another portion of this liquor through a branch pipe 34 and by means of one or more associated liquor impact plates 35 discharges a substantially continuous sheet or curtain of the liquor across the entrance area of the tangential inlet 30. With the described arrangement of liquor nozzles, the flow of residual liquor to the nozzles 32 and 33 can be readily regulated to secure the desired reduction in temperature of the liquor-laden flue gases entering the evaporator 10.

A spraying device 36 is positioned axially of the lower part of the evaporator chamber superjacent the flue gas inlet 30 and arranged to receive a mixture of partially dehydrated residual liquor, which has been previously sprayed into the evaporator, from a sump tank 37 through a pump 38 and a pipe 40 connected thereto. The tank 37 is connected to the bottom of the evaporator chamber by a drain pipe 41, so that liquor running down the walls of the evaporator chamber will collect in the tank without forming a pool in the bottom of the chamber. The spraying device 36, illustrated in Figs. 5 and 6, consists of a vertical discharge branch section 42 of the pipe 40 on the upper end of which a pair of vertically spaced shallow conical plates 43 and 44 are mounted, the discharging liquor impacting on the center section of the plate 43 and discharging as a relatively coarse spray over the entire circumference of the plate. The plates are so shaped that the spray discharges at a slightly downward angle across the path of the whirling ascending gas stream. The sprays from the spray devices 32, 33 and 36 are further subdivided by the whirling gases and an intimate mixture of the spray particles and gases in the chamber results, providing a large heat transfer contact area therebetween sufficient to effect the desired evaporation effect on the sprayed liquor. The gaseous sulfur oxides in the flue gases are simultaneously absorbed by the alkaline liquor sprays, so that the recovered sulfur can recombine with the liquor, increasing the total sulfur content of the liquor. If the nozzles 32 should be of sufficient capacity to handle all of the partly concentrated liquor from the multiple effect evaporators, the spray nozzles 33 can advantageously be connected to the pipe 42 to receive recirculated liquor.

The intimate contact of the sprayed liquor with the entering flue gases thus not only substantially reduces the gas temperature and concentrates the liquor by the evaporation of included moisture, but also washes out as a precipitate the entrained solid matter or coagulated sodium sulfate dust in those gases. The cyclonic action and flow path of the liquor-laden gas stream in the evaporator tends to effect the substantially complete separation of the coagulated dust particles and sprayed liquor droplets from the flue gases and their deposition on the chamber walls before the gases leave the evaporator. The gaseous sulfur oxides in the flue gases will be substantially completely absorbed in the cyclone evaporator by the sprayed liquor.

The solid and liquor particles depositing on the evaporator chamber walls are continuously removed by maintaining a continuous film or sheet of recycled liquor downwardly over these surfaces. For this purpose, another portion of recycled liquor is delivered through the pipe 40 to a horizontally disposed annular header 45 exteriorly surrounding the upper portion of the evaporator 10. A series of tangentially arranged liquor spray nozzles 46 are symmetrically spaced circumferentially around the inside wall of the evaporator intermediate the top of the chamber and the lower end of the duct 31. Each spray nozzle is connected with the header 45 and arranged to discharge liquor downwardly at a slight angle to the horizontal, sweeping the inside vertical wall of the evaporator. The sprays are directed in the same angular direction as the ascending stream of liquor-laden gas, forming a descending film of liquor swept by the ascending gas stream. The descending liquor washes the interior wall surface of the evaporator and removes any solids that may deposit thereon. The resulting wet surface of the wall aids in the separation of liquor and solid particles from the whirling gas stream in the chamber. Separation of any remaining particles occurs on the change in direction of the gases in the annular space surrounding the duct 31. With the described evaporator construction and operation, mechanical carry-over of black liquor in the gases was found to be eliminated. There was no evidence that any carbonization of the black liquor had occurred, and at the same time carbonation was insufficient to cause lignin precipitation. The temperature of the gases leaving the cyclone evaporator is readily maintained at a desired value by regulating the volume of recirculated liquor. For example, with a sulfate residual liquor previously stabilized by oxidation, as disclosed in the previously mentioned co-pending application, the gases leaving the evaporator were maintained at an equilibrium temperature of 130–190° F. for a substantially complete absorption of the gaseous sulfur compounds. A substantial concentration of the liquor was effected, the solid concentration of the liquor leaving the multiple effect evaporator at about 35–40% being raised to about 55%, for example.

Figure 8:
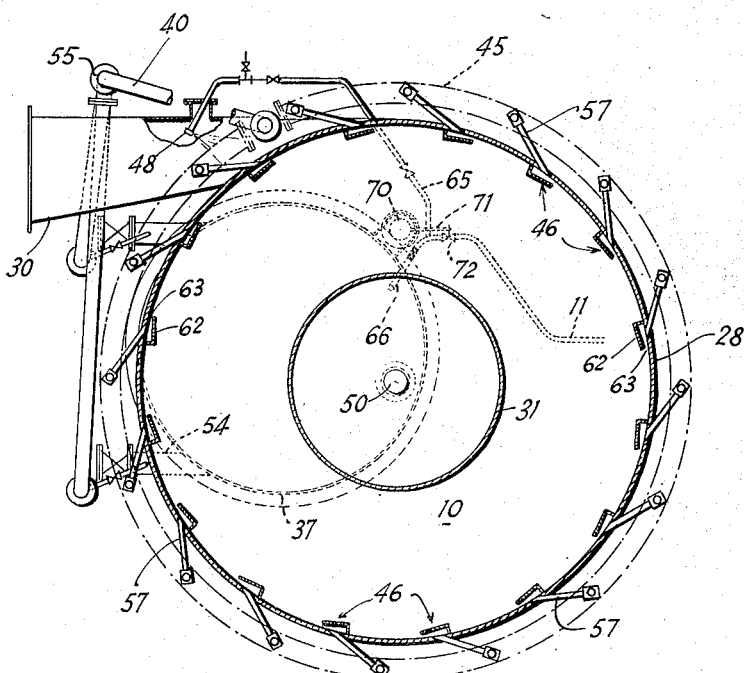
Fig. 8 is a horizontal section on the line 8—8 of Fig. 7.
Figure 7:
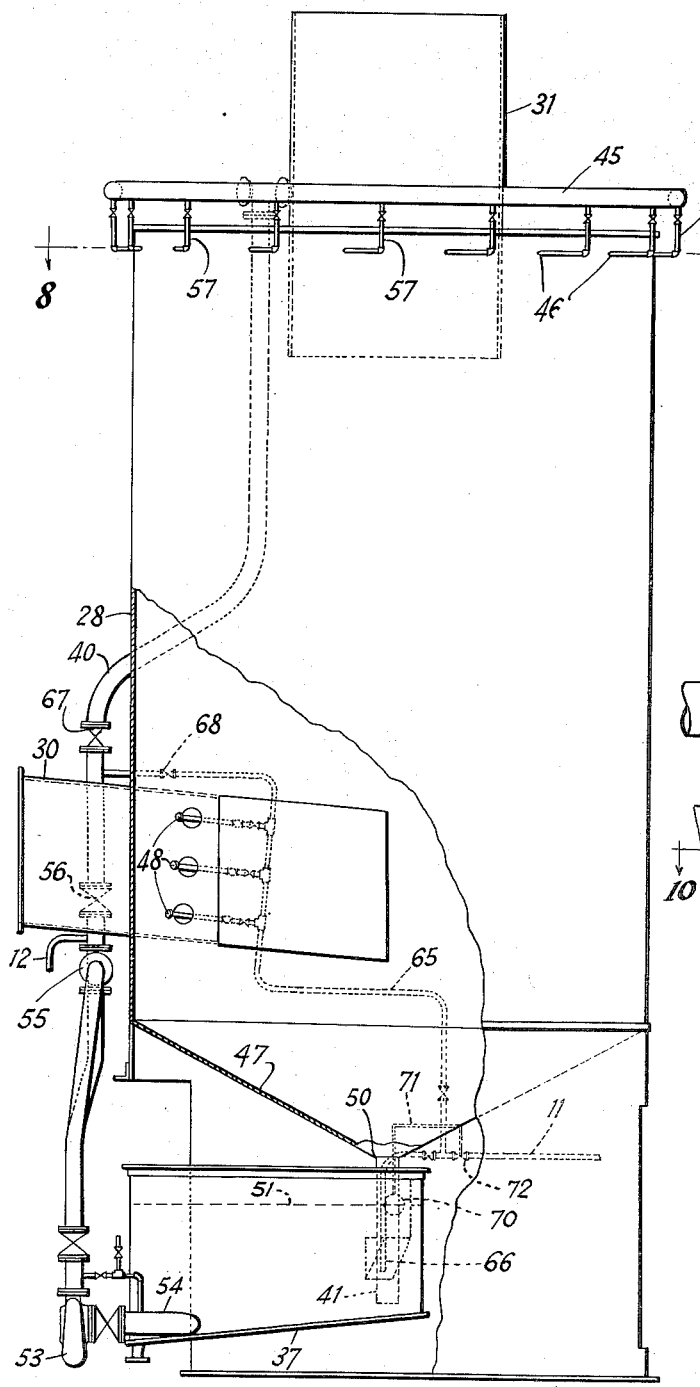
Fig. 7 is an elevation view of a modified construction of the cyclone evaporator.

A modified arrangement of the cyclone evaporator of the present invention is shown in Figs. 7 and 8. This arrangement is particularly applicable to circumstances wherein the temperature of the flue gases leaving the evaporator through the duct 31 must be maintained above the gas dew point temperature to avoid subsequent condensation of corrosive sulfur containing compounds. Such circumstances arise during the treatment of unoxidized sulfate residual liquors.

The modified construction is essentially similar to the cyclone evaporator shown in Figs. 2–6, and similar reference numerals have been used to indicate similar parts therein, with altered constructional details and a modified arrangement of spray nozzles and their piping connections. The cylindrical body 28 of the cyclone evaporator 10 is extended below the inverted conical bottom 47 of the cyclonic chamber to enclose the sump tank 37 and to provide a structural support for the evaporator. The flue gases enter the evaporator through the tangential inlet 30, pass upwardly in a helical path along the walls of the chamber, and are exhausted through the centrally located inwardly projecting outlet duct 31. The entering flue gases are cooled by intimate contact with a spray of residual liquor which is projected into the gas stream by a group of vertically arranged, equally spaced nozzles 48. Each of the nozzles is arranged to discharge a conical spray of liquor into the inlet 30 at an oblique angle to the direction of gas flow. Each spray cone has an apex angle of approximately 70° with the cones from adjacent nozzles intersecting to form a curtain of spray through which the gases pass in entering the cyclone evaporator. The nozzles are positioned with the slope of their spray cones arranged to clear the side walls of the tangential inlet 30 so as to avoid spray impact thereon and the deposition of liquor in the evaporator entrance. In addition, the inlet 30 is downwardly inclined at a slight angle to the horizontal to facilitate drainage into the evaporator of any liquid accumulated therein during starting up and shutting down periods of evaporator operation.

The sump tank 37 is circular in horizontal cross-section with its vertical axis horizontally spaced from the centerline of the evaporator. Concentrated liquor flowing over the conical bottom 47 of the evaporator passes through a centrally located outlet 50 and through the discharge pipe 41 into the sump tank. The pipe 41 extends into the tank to a spaced position below the liquor level advantageously maintained in the tank. The normal liquor level maintained in the tank is indicated, for example, at 51. The tank 37 is constructed of a suitable size so that rapid changes in the Baume of the liquor collected therein are not likely to occur.

A pair of liquor pumps 53 are arranged for alternate service in withdrawing concentrated liquor from the tank 37 through individual outlet pipe connections 54. The pump discharge conduits are joined at a Y fitting 55 for the discharge of concentrated liquor into an upright liquor pipe 49. The pipe 40 is provided with a branch pipe connection 12 leading to the mixing tank 13, as shown in Fig. 1 and extends to the annular header 45 positioned adjacent the upper end of the evaporator 10. A suitable flow control valve 56 is positioned in the pipe 40 to regulate the flow of liquor therethrough as hereinafter described. The liquor delivered to the header 45 is discharged through a circumferentially spaced series of nozzles 46 which are arranged to project tangential streams or jets of recirculated liquor against the interior wall of the evaporator to form a continuous film of downwardly flowing liquor thereon. The jets of liquor are downwardly inclined at a slight angle with respect to the horizontal so as to avoid an impact of spray from one nozzle on the adjacent nozzle, and the direction of each spray is the same as the helical flow path of the flue gases passing through the cyclonic chamber. The "wetted wall" of the evaporator effectively prevents the accumulation of solids thereon and absorbs solids, liquids and sulfur oxide gases brought in contact therewith by the centrifugal forces acting upon the ascending gas stream.

Figure 10:
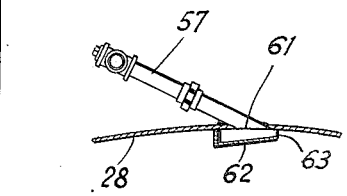
Fig. 10 is a horizontal section on the line 10—10 of Fig. 9.
Figure 9:
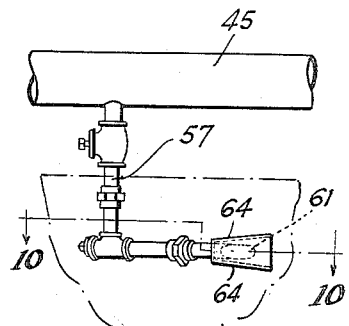
Fig. 9 is an enlarged elevation view of an individual spray nozzle shown in Figs. 2, 3, 7 and 8.

An enlarged view of a nozzle 46 is shown in Figs. 9 and 10. Recirculated liquor from the header 45 passes through a valved pipe 57 which is installed at an angle of approximately 30° to the wall of the evaporator. The open end 61 of the pipe is flush with the inside face of the evaporator wall and is enclosed by a housing which has a vertically elongated opening 63 at one end. The internal plate 62 and the diverging sides 64 of the housing taper to form an elongated slit defining the opening 63 which directs a thin fan-like sheet of liquor spray against the adjacent wall of the evaporator.

In regulating the temperature of the gases discharging from the evaporator 10 through the duct 31 the rate of flow of recirculated liquor introduced through the nozzles 46, as well as the rate of flow of partially concentrated liquor introduced through the nozzles 48 are determinative. However, since the temperature of the partially concentrated liquor is normally lower than that of the recirculated liquor the liquor spray from the nozzles 48 will have the greatest temperature difference with respect to the entering hot flue gas and be more effective in reducing gas temperatures. For low evaporation rates it would be possible to attain sufficient liquor gas contact by the use of the nozzles 48 alone, but since the "wetted wall" effect obtained by use of recirculated liquor through the nozzles 46 is effective for other purposes, as hereinbefore described, the piping for the delivery of liquor to both sets of nozzles is arranged for any desirable evaporating rate in the evaporator while using both sets of nozzles.

This is accomplished by connecting the pipe 11 to both the sprays 48 and to the sump tank 37 through the valved pipes 65 and 66 respectively. In addition the pipe 65 is extended beyond the take-off connections to the nozzles 48 to the upright pipe 49. Thus, when desired for extremely low rates of evaporation, the partially concentrated liquor passing through the pipe 11 may be directed to the sump tank 37 through the pipe 66. This partially concentrated or make-up liquor will dilute the previously concentrated liquor in the tank and tend to lower the liquor temperature therein. The diluted liquor withdrawn from the tank 37 by the pumps 53 will be directed in part through the pipe 12, in part through the extension of pipe 65 from pipe 49 to the nozzles 48, and in part through the nozzles 46. The flow of liquor may be proportioned between the nozzles 46 and 48 by regulation of the valves 67 and 68.

Normally the evaporation rate in the evaporator 10 will permit the flow of liquor through the pipe 11 directly to the nozzles 48. Under these conditions the valved pipe 66 will be adjusted to prevent flow of liquor therethrough and the valve 68 will also be closed. However, as a further alternative operating procedure, when dictated by flue gas discharge temperatures, the flow of liquor through the pipe 11 may be directed through both of the pipes 65 and 66, in any desired proportion. Ordinarily under any of these operating procedures, the proportion of recirculated liquor flow to partially concentrated or make-up liquor flow through the evaporator will be in the range of from 7–10 to 1, by volume.

In any event, the flow of liquor through the pipe 11 is regulated in response to the level of liquor in the sump tank 37. As shown, this may be accomplished by a float 70 mechanically connected through a linkage 71 to a flow control valve 72 in the pipe 11. Other control arrangements can, of course, be used as actuated by liquor level in the tank 37.

In concentrating unstabilized sulfate residual liquor in a commercial cyclone evaporator of the type illustrated in Figs. 7 and 8, the solid content of the liquor was increased from approximately 50% to approximately 64%. This was accomplished with an entering gas temperature of 670° F. and a leaving gas temperature of 318° F. The leaving gas temperature was safely above the saturation temperature of the flue gases and the condensation of corrosive compounds in the associated apparatus was avoided. The solid particle content entrained with the flue gases entering the cyclone evaporator was substantially reduced in passing therethrough, as determined by weight analysis, and the sulfur oxide content in the gases was also substantially reduced by absorption in the contacting liquor, as determined by chemical analysis.

While in accordance with the provisions of the statutes we have illustrated and described herein the best form of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. Apparatus for the concentration of pulp residual liquor containing chemical solids in solution and suspension comprising a cylindrically walled substantially unobstructed chamber having a concentrated liquor outlet in the bottom and a central gas outlet in the upper portion thereof, a gas duct tangentially positioned in the circumferential wall of said chamber for the introduction of hot gases thereto, a plurality of spray means mounted adjacent the outlet of said gas duct and arranged to discharge transversely across the entrance of said gas duct into said chamber for introducing the pulp residual liquor to be evaporated in a relatively coarsely divided condition into the hot gases entering said chamber and throughout substantially the entire cross-sectional area of said duct, and means for wetting the circumferential wall of said chamber comprising a series of spray nozzles circumferentially spaced in the upper portion of said chamber and positioned adjacent said circumferential wall and arranged to discharge streams of liquor against the inner surface of said circumferential wall.

2. Apparatus for the concentration of pulp residual liquor containing chemical solids in solution and suspension comprising a cylindrically walled substantially unobstructed chamber having a concentrated liquor outlet in the bottom and a central gas outlet in the upper portion thereof, a gas outlet duct projecting a spaced distance through said central gas outlet and into the upper portion of said chamber, a gas duct tangentially positioned in the lower portion of said chamber for the introduction of hot gases thereto, spray means for introducing the pulp residual liquor to be evaporated in a relatively coarsely divided condition into the hot gases entering said chamber and throughout substantially the entire cross-sectional area of said duct, and means for wetting the circumferential wall of said chamber comprising a series of spray nozzles circumferentially spaced in the upper portion of said chamber between said gas outlet duct and said circumferential wall and arranged to discharge substantially horizontally directed streams of liquor tangentially against the inner surface of said circumferential wall.

3. Apparatus for the concentration of pulp residual liquor containing chemical solids in solution and suspension comprising a cylindrically walled substantially unobstructed chamber having a concentrated liquor outlet in the bottom and a central gas outlet in the upper portion thereof, a gas outlet duct projecting a spaced distance through said central gas outlet and into the upper portion of said chamber, a gas duct tangentially positioned in the lower portion of said chamber for the introduction of hot gases thereto, spray means for introducing the pulp residual liquor to be evaporated in a relatively coarsely divided condition into the hot gases entering said chamber and throughout substantially the entire cross-sectional area of said duct, a sump tank positioned below and connected with the concentrated liquor outlet in the bottom of said chamber so as to be substantially out of direct contact with the hot gases entering said chamber, and means for wetting the circumferential wall of said chamber comprising a series of spray nozzles circumferentially spaced in the upper portion of said chamber and positioned adjacent said circumferential wall and arranged to discharge streams of liquor tangentially against the inner surface of said circumferential wall.

4. Apparatus for the concentration of pulp residual liquor containing chemical solids in solution and suspension comprising a cylindrically walled substantially unobstructed chamber having a concentrated liquor outlet in the bottom and a central gas outlet in the upper portion thereof, a gas duct tangentially positioned in the lower portion of said chamber for the introduction of hot gases thereto, a plurality of spray means mounted adjacent the outlet of said gas duct and arranged to discharge transversely across the entrance of said gas duct into said chamber for introducing the pulp residual liquor to be evaporated in a relatively coarsely divided condition into the hot gases entering said chamber and throughout substantially the entire cross-sectional area of said duct, a sump tank positioned below and connected with the concentrated liquor outlet in the bottom of said chamber so as to be substantially out of direct contact with the hot gases entering said chamber, and means for wetting the circumferential wall of said chamber comprising a series of spray nozzles circumferentially spaced in the upper portion of said chamber and positioned adjacent said circumferential wall and arranged to discharge streams of liquor tangentially against the inner surface of said circumferential wall, a header exteriorly encircling the upper portion of said chamber, separate pipe connections between each of said spray nozzles and said header, and a piping system including a pump connecting said sump tank with said header for recirculation of a portion of the concentrated liquor through said chamber.

5. Apparatus for the concentration of pulp residual liquor containing chemical solids in solution and suspension comprising a cylindrically walled substantially unobstructed chamber having a concentrated liquor outlet in the bottom and a central gas outlet in the upper portion thereof, a gas duct tangentially positioned in the lower portion of said chamber for the introduction of hot gases thereto, spray means for introducing the pulp residual liquor to be evaporated in a relatively coarsely divided condition into the hot gases entering said chamber and throughout substantially the entire cross-sectional area of said duct, a sump tank positioned below and connected with the concentrated liquor outlet in the bottom of said chamber so as to be substantially out of direct contact with the hot gases entering said chamber, and means for wetting the circumferential wall of said chamber comprising a series of spray nozzles circumferentially spaced in the upper portion of said chamber and positioned adjacent said circumferential wall and arranged to discharge streams of liquor tangentially against the inner surface of said circumferential wall, a header exteriorly encircling the upper portion of said chamber and connected with each of said spray nozzles by a separate pipe, a weak liquor supply pipe, and a valved pipe system connecting said weak liquor supply pipe with said sump tank, spray means and spray nozzles.

GEORGE H. TOMLINSON.
JOSEPH N. SWARTZ.

REFERENCES CITED

The following references are of record in the file of this patent:

UNITED STATES PATENTS

| Number | Name | Date |
|---|---|---|
| 621,718 | Seymour | Mar. 21, 1899 |
| 1,734,677 | Kreisenger | Nov. 5, 1929 |
| 2,054,441 | Peebles | Sept. 15, 1936 |
| 2,056,266 | Goodell | Oct. 6, 1936 |
| 2,103,521 | Lully | Dec. 28, 1937 |
| 2,314,159 | Peebles | Mar. 16, 1943 |
| 2,396,689 | Davis | Mar. 19, 1946 |